US012518211B2

(12) United States Patent
Reynolds et al.

(10) Patent No.: US 12,518,211 B2
(45) Date of Patent: Jan. 6, 2026

(54) OBTAINING USER FEEDBACK ON MODELS VIA A HUMAN MACHINE INTERFACE (HMI)

(71) Applicant: Rockwell Automation Technologies, Inc., Mayfield Heights, OH (US)

(72) Inventors: Jordan C. Reynolds, Austin, TX (US); John J. Hagerbaumer, Mequon, WI (US); Troy W. Mahr, Pleasant Prairie, WI (US); Thomas K. Jacobsen, Wake Forest, NC (US); Giancarlo Scaturchio, Pisa (IT)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 820 days.

(21) Appl. No.: 17/850,411

(22) Filed: Jun. 27, 2022

(65) Prior Publication Data

US 2023/0419168 A1    Dec. 28, 2023

(51) Int. Cl.
*G06N 20/00*  (2019.01)
*G06F 18/21*  (2023.01)
*G06F 18/214* (2023.01)
*G06F 18/40*  (2023.01)

(52) U.S. Cl.
CPC ........... *G06N 20/00* (2019.01); *G06F 18/214* (2023.01); *G06F 18/2178* (2023.01); *G06F 18/40* (2023.01)

(58) Field of Classification Search
CPC ..... G06N 20/00; G06F 18/2178; G06F 18/40; G06F 18/214
See application file for complete search history.

(56) References Cited

U.S. PATENT DOCUMENTS

| 10,216,177 B2 | 2/2019 | Gildert et al. |
| 11,740,624 B2 | 8/2023 | Ramamurthy et al. |
| 2012/0158623 A1 | 6/2012 | Bilenko et al. |

(Continued)

OTHER PUBLICATIONS

Non-Final Office Action issued by the United States Patent and Trademark Office in U.S. Appl. No. 17/851,628 on Sep. 13, 2024, 24 pages.

(Continued)

*Primary Examiner* — Casey R. Garner

(57) ABSTRACT

Various embodiments of the present technology generally relate to industrial automation environments. More specifically, embodiments include systems and methods to train machine learning systems based on user operations in an industrial automation environment. In some examples, a Human Machine Interface (HMI) component displays a machine learning output indicating a training state of a machine learning model on a user interface and user feedback regarding the training state. A machine learning interface component weights feature vectors based on the user feedback and supplies the weighted feature vectors to the machine learning model. The machine learning interface component receives another machine learning output that indicates an updated training state for the model. The HMI component displays the output indicating the updated training state of the model, receives additional user feedback regarding the updating training state, and transfers the additional user feedback to the machine learning interface component.

20 Claims, 7 Drawing Sheets

(56) References Cited

U.S. PATENT DOCUMENTS

| | | | |
|---|---|---|---|
| 2016/0275413 A1* | 9/2016 | Shi | G06N 20/00 |
| 2019/0102657 A1 | 4/2019 | Sayyarrodsari et al. | |
| 2019/0354093 A1 | 11/2019 | Nguyen et al. | |
| 2020/0050968 A1* | 2/2020 | Lee | G06N 20/00 |
| 2020/0103838 A1 | 4/2020 | Bertinetti et al. | |
| 2020/0150638 A1* | 5/2020 | Mourzine | G05B 19/058 |
| 2021/0042638 A1 | 2/2021 | Novotny | |
| 2021/0090105 A1 | 3/2021 | Nordmark et al. | |
| 2021/0097456 A1 | 4/2021 | Sayyarrodsari et al. | |
| 2021/0389748 A1 | 12/2021 | Mcadam et al. | |
| 2021/0397152 A1 | 12/2021 | Chen | |
| 2022/0292338 A1 | 9/2022 | Nair et al. | |
| 2022/0388160 A1 | 12/2022 | Yonemoto et al. | |
| 2022/0390515 A1 | 12/2022 | Pickerd et al. | |
| 2023/0145448 A1 | 5/2023 | Huber et al. | |
| 2023/0359173 A1 | 11/2023 | Hildebrandt | |

OTHER PUBLICATIONS

Notice of Allowance in U.S. Appl. No. 17/826,689, mailed Aug. 6, 2024, 19 pages.

Non-Final Office Action in U.S. Appl. No. 17/843,122, mailed Jul. 3, 2024, 61 pages.

W. Bolton, Programmable Logic Controllers, 2015, [Retrieved on Dec. 20, 2024], Retrieved from the internet: <URL: https://d1wqtxts1xzle7.cloudfront.net/97293880/William_Bolton_Programmable_Logic_Controllers_Sixth_Edition_Newnes_2015_-libre.pdf?> 412 Pages (1-412) (Year: 2015).

* cited by examiner

OBTAINING USER FEEDBACK ON MODELS VIA A HUMAN MACHINE INTERFACE (HMI)

TECHNICAL FIELD

Various implementations disclosed herein relate to industrial automation technology, and to visualizing machine learning model health.

BACKGROUND

Industrial manufacturing environments generate huge quantities of data at fast speeds making the extraction of enterprise-level insights challenging. In industrial automation environments, control systems are used to drive various operations along an industrial line. Control programs are developed by programmers and comprise a set of program tags to carry out an industrial operation. The program tags comprise chunks of the control code and correspond to Original Equipment Manufacturer (OEM) devices like industrial assets, machinery, devices, and sensors. The control programs are executed by control systems like Programmable Logic Controllers (PLCs) to drive the OEM industrial assets, machinery, devices, and sensors in an industrial process. Industrial manufacturing environments typically comprise a Human Machine Interfaces (HMIs) that allow plant operators to interact with the PLCs and the OEM assets. For example, a plant operator may utilize an HMI to decrease an operating speed of an OEM asset. The HMIs comprise user interface systems that present the status and operational relationships of the PLCs and the OEM assets.

Machine learning algorithms are designed to recognize patterns and automatically improve through training and the use of data. Examples of machine learning algorithms include artificial neural networks, nearest neighbor methods, gradient-boosted trees, ensemble random forests, support vector machines, naïve Bayes methods, and linear regressions. A machine learning algorithm comprises an input layer and an output layer, wherein complex analyzation takes places between the two layers. Various training methods are used to train machine learning algorithms wherein an algorithm is continually updated and optimized until a satisfactory model is achieved. One advantage of machine learning algorithms is their ability to learn by example, rather than needing to be manually programmed to perform a task, especially when the tasks would require a near-impossible amount of programming to perform the operations in which they are used. However, industrial automation environments do not effectively or efficiently train machine learning models for use within the industrial automation environments. Moreover, the industrial automation environments do not effectively or efficiently integrate user experience with machine learning models into the model training processes.

Overview

This Overview is provided to introduce a selection of concepts in a simplified form that are further described below in the Detailed Description. This summary is not intended to identify key features or essential features of the claimed subject matter, nor is it intended to be used as an aid in determining the scope of the claimed subject matter.

Various embodiments of the present technology generally relate to solutions for integrating machine learning models into industrial automation environments. Some embodiments comprise a system to train machine learning systems based on user operations in an industrial automation environment. In some examples, the system comprises a machine learning component and a Human Machine Interface (HMI) component. The HMI component displays a first machine learning output indicating a training state of a machine learning model on a user interface. The HMI component receives a user input comprising user feedback regarding the training state and transfers the user feedback to a machine learning interface component. The machine learning interface component receives the user feedback and weights feature vectors configured for ingestion by the machine learning model based on the user feedback. The machine learning interface component supplies the weighted feature vectors to the machine learning model. The machine learning interface component receives a second machine learning output from the machine learning model. The second machine learning output indicates an updated training state for the machine learning model. The machine learning interface component transfers the second machine learning output to the HMI component. The HMI component displays the second machine learning output indicating the updated training state of the machine learning model. The HMI component receives an additional user input comprising additional user feedback regarding the updating training state and transfers the additional user feedback to the machine learning interface component.

In some embodiments, a method for training machine learning systems based on user operations in an industrial automation environment is disclosed. The method comprises displaying, by a system comprising a processor, a first machine learning output indicating a training state of a machine learning model on a user interface. The method continues by receiving, by the system, a user input comprising user feedback regarding the training state. The method continues with weighting, by the system, feature vectors configured for ingestion by the machine learning model based on the user feedback and supplying the weighted feature vectors to the machine learning model. The method continues by receiving, by the system, a second machine learning output from the machine learning model that indicates an updated training state for the machine learning model. The method continues with displaying, by the system, the second machine learning output indicating the updated training state of the machine learning model and receiving an additional user input comprising additional user feedback regarding the updating training state.

In some embodiments, a non-transitory computer-readable medium stored thereon instructions to train machine learning systems based on user operations in an industrial automation environment is disclosed. The instructions, in response to execution, cause a system comprising a processor to perform operations. The operations comprise displaying a first machine learning output indicating a training state of a machine learning model on a user interface. The operations further comprise receiving a user input comprising user feedback regarding the training state. The operations further comprise weighting feature vectors configured for ingestion by the machine learning model based on the user feedback and supplying the weighted feature vectors to the machine learning model. The operations further comprise receiving a second machine learning output from the machine learning model that indicates an updated training state for the machine learning model. The operations further comprise displaying the second machine learning output indicating the updated training state of the machine learning model and receiving an additional user input comprising additional user feedback regarding the updating training state.

BRIEF DESCRIPTION OF THE DRAWINGS

Many aspects of the disclosure can be better understood with reference to the following drawings. The components in the drawings are not necessarily drawn to scale. Moreover, in the drawings, like reference numerals designate corresponding parts throughout the several views. While several embodiments are described in connection with these drawings, the disclosure is not limited to the embodiments disclosed herein. On the contrary, the intent is to cover all alternatives, modifications, and equivalents.

Figure 1:
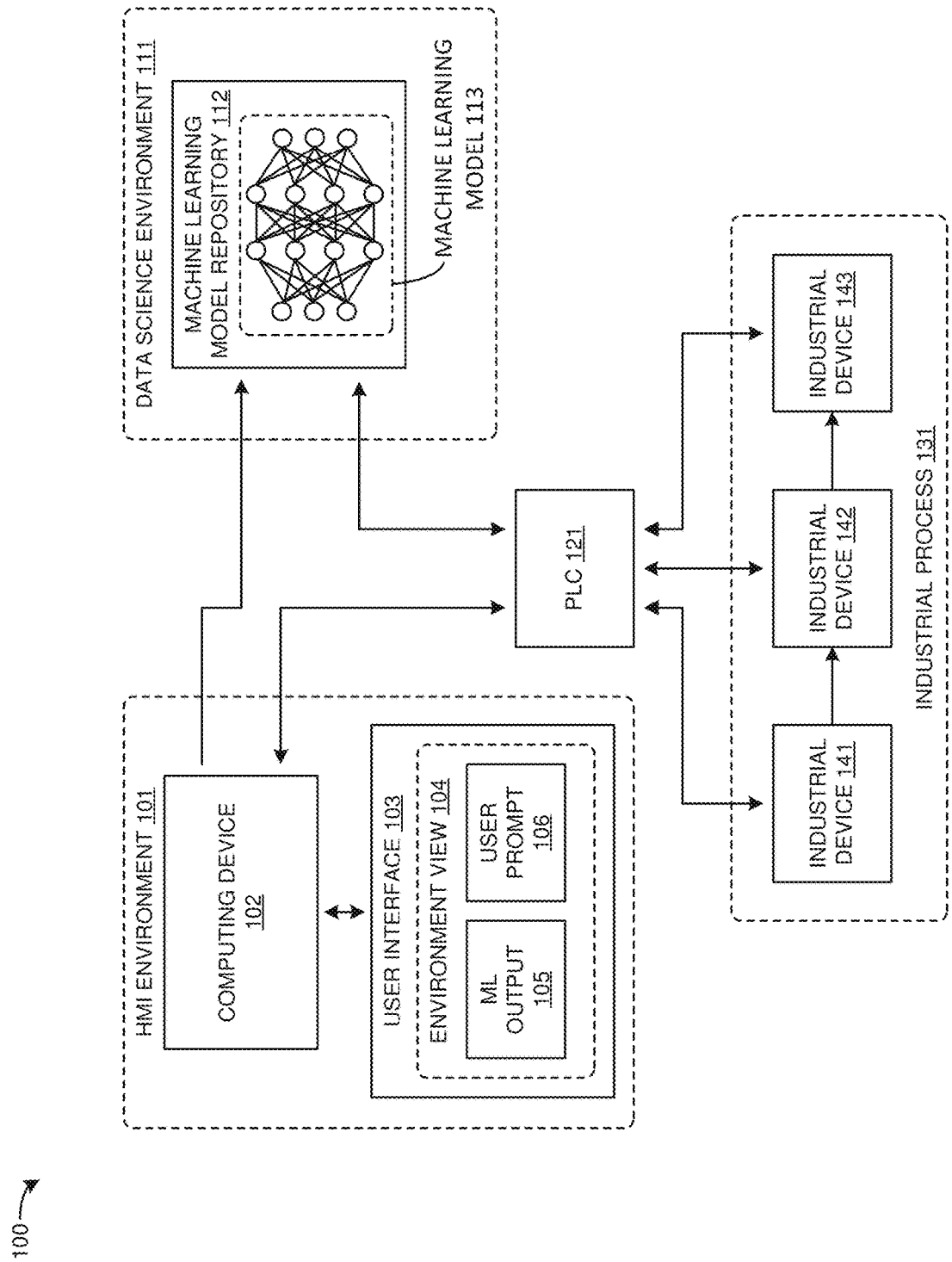
FIG. 1 illustrates an exemplary industrial automation environment to train machine learning systems based on user operations.

The drawings have not necessarily been drawn to scale. Similarly, some components or operations may not be separated into different blocks or combined into a single block for the purposes of discussion of some of the embodiments of the present technology. Moreover, while the technology is amendable to various modifications and alternative forms, specific embodiments have been shown by way of example in the drawings and are described in detail below. The intention, however, is not to limit the technology to the particular embodiments described. On the contrary, the technology is intended to cover all modifications, equivalents, and alternatives falling within the scope of the technology as defined by the appended claims.

DETAILED DESCRIPTION

The following description and associated figures teach the best mode of the invention. For the purpose of teaching inventive principles, some conventional aspects of the best mode may be simplified or omitted. The following claims specify the scope of the invention. Note that some aspects of the best mode may not fall within the scope of the invention as specified by the claims. Thus, those skilled in the art will appreciate variations from the best mode that fall within the scope of the invention. Those skilled in the art will appreciate that the features described below can be combined in various ways to form multiple variations of the invention. As a result, the invention is not limited to the specific examples described below, but only by the claims and their equivalents.

Various embodiments of the present technology generally relate to solutions for integrating machine learning models into industrial automation environments. More specifically, embodiments of the present technology include systems and methods for training machine learning systems based on user feedback in an industrial automation environment. The present technology serves to enhance industrial control and machine learning system performance by enabling the display of machine learning predictions within HMIs to receive user feedback indicating a satisfaction level on the training state of machine learning model. The training of the model may then be tailored to reflect the user feedback. Industrial automation environments often fail to effectively integrate machine learning models to assist in the live control of industrial devices. Moreover, the training of machine learning models does not effectively integrate the user experience in the industrial automation environments. In an implementation of the present technology, machine learning models provide operational data that characterizes their outputs, predictions, and health to HMIs. The HMIs receive the data and display visualizations of the models. The HMIs receive user inputs indicating feedback regarding the outputs, predictions, and health of the models. Machine learning interface application utilize the user feedback to augment the training of the models.

In accordance with the present disclosure, machine learning models may be connected with other elements within the industrial automation environment like industrial controllers and HMIs. In an embodiment, industrial controllers are connected to and control industrial devices. The industrial controllers receive process data generated by the devices and responsively feed the process data to a machine learning model. The machine learning model generates machine learning predictions to optimize the operations of the industrial devices. The machine learning models compiles operational data that characterizes the predictions and transfers the operational data to an HMI to receive user feedback on the predictions.

In accordance with the present disclosure, a machine learning model comprises one or more machine learning algorithms that are trained based on historical data and/or other types of training data. A machine learning model may employ one or more machine learning algorithms through which data can be analyzed to identify patterns, make decisions, make predictions, or similarly produce output that can inform control code and/or parameters. Examples of machine learning algorithms that may be employed solely or in conjunction with one another include artificial neural networks, nearest neighbor methods, ensemble random forests, support vector machines, naïve Bayes methods, linear regressions, or similar machine learning techniques or combinations thereof capable of predicting output based on input data. Determining which machine learning methods to use may depend on the specific purpose or functions required in a particular industrial setting. In some examples, a machine learning asset is integrated with an industrial controller and outputs control signaling that drives the industrial controller to control industrial devices.

Machine learning models may be deployed on premises in an industrial automation environment or off-site. For example, the machine learning model may be implemented in a data science environment and possess data pipelines to receive industrial data from industrial controllers and transfer machine learning operational data for display on HMIs. Machine learning models undergo training periods to improve their performance over time. In an implementation, an operator may view the training state of a machine learning model on an HMI and responsively input user feedback to advance the training state of the model. This training procedure may be cyclical. Thus, the machine learning assets disclosed herein may form a feedback loop to periodically advance their training based on user feedback.

To accompany the use of machine learning models, corresponding faceplates, displays, HMIs, and the like are contemplated herein to provide intuitive representations and interfaces to models on-site. A faceplate may comprise basic controls and/or visuals relevant to the to assist in visualizing a model for to manage the model's operations within the industrial environment. In this manner, machine learning can be brought into the on-site user experience. For example, an operator can view or use a kiosk within the industrial automation environment to perform a task such as reviewing machine learning control signaling, accessing model health, identifying model prediction accuracy, and/or imputing user feedback regarding the machine learning predictions. The faceplate may also be useful for performing tasks such as offsetting parameters, providing inputs, tuning parameters of the model, overriding the model, checking the status of the model, or taking the model offline.

Now referring to the Figures, FIG. 1 illustrates industrial automation environment 100 to train machine learning systems based on user operations in an industrial automation environment. Industrial automation environment 100 performs services like factory automation, factory control, machine control, smart manufacturing, machine communication and organization, and the like. Industrial automation environment 100 comprises Human Machine Interface (HMI) environment 101, data science environment 111, Programmable Logic Controller (PLC) 121, industrial process 131, and industrial devices 141-143. HMI environment 101 comprises computing device 102 and HMI 103. HMI 103 displays environment view 104 which comprise machine learning (ML) output 105 and user prompt 106. Data science environment 111 is representative of a data processing system to analyze data generated in industrial automation environment 100 and comprises machine learning model repository 112. Repository 112 is configured to host machine learning model 113. Industrials devices 141-143 are representative of a set machinery configured to implement industrial process 131.

HMI environment 101 is representative of an HMI system that allows human operators to view and affect the operations of industrial automation environment 100. Computing device 102 comprises one or more computing apparatuses configured to host an application(s) to visualize the operations of and provide user feedback for machine learning model 113 on HMI 103. Computing device 102 is also configured to host an application(s) to interface with machine learning model repository 112. It should be appreciated that the specific number of applications/modules hosted by computing device 102 is not limited. Computing device 102 may comprise one or more server computers, mobile computing devices, personal computers, tablet computers, and the like. Computing device 102 is operatively coupled to HMI 103. HMI 103 comprises one or more user interface components like displays, kiosks, keyboards, touchscreens, tablet devices, and the like. The user interface components display environment view 104. Environment view 104 comprises a Guided User Interface (GUI) that allows a user to interact with the application(s) hosted by computing device 102, including the application(s) to view the operations of, and provide user feedback for, machine learning model 113.

Computing device 102 is coupled to data science environment 111. For example, the machine learning interface applications hosted by computing device 102 may communicate with machine learning model repository 112 to receive machine learning outputs from, and provide user machine learning inputs to, machine learning model 113. Machine learning model repository 112 hosts machine learning model 113 and is operatively coupled to PLC 121.

Machine learning model 113 is representative of any machine learning model implemented within industrial automation environment 100 as described herein. Machine learning model 113 is configured to ingest process inputs from PLC 121. The process inputs may comprise feature vectors characterizing the operations of industrial devices 141-143. Machine learning model 113 generates and transfers machine outputs to PLC 121. The machine learning outputs influence the operations of industrial devices 141-143 to affect industrial process 131. For example, PLC 121 may receive and execute a machine learning output generated by model 113 and responsively transfer control signaling to industrial device 141 to lower the operating temperature of device 141. In some examples, repository 112 and PLC 121 comprise a single computing apparatus configured to control devices 141-143 and host model 113. For example, PLC 121 may host model 113 and comprise Application Specific Integrated Circuits (ASICs) or Field Programmable Gate Arrays (FPGAs) configured to implement machine learning functions (e.g., feature extraction and model hosting).

Machine learning model 113 is also configured to transfer machine learning outputs to HMI environment 101 for display on HMI 103 as machine learning output 105. An operator may view machine learning output 105 on HMI 103. Machine learning output 105 may comprise machine learning predictions made by machine learning model 113. The predictions may comprise predicted process values for use by PLC 121 in controlling industrial process 131. For example, a machine learning prediction may comprise a predicted internal pressure for industrial device 141. Machine learning output 105 may also comprise actual process values that allows an operator to compare the predicted values generated by model 113 with actual values reported by PLC 121.

Machine learning model 113 is configured to receive user feedback from HMI environment 101. The user feedback may be used to advance the training state of machine learning model 112. For example, HMI 103 may display user prompt 106 in environment view 104. User prompt 106 may comprise toggles for a user to indicate their approval or disapproval of machine learning output 105. For example, the toggles may allow a user to accept/reject machine learning predictions generated by model 113 using on screen features of environment view 104. Computing device 102 may transfer user feedback received via HMI 103 for delivery to machine learning model 113. Repository 112 may utilize the user feedback to advance the training state of model 113. For example, the machine learning interface application hosted by computing device 102 may adjust the weights of feature vectors based on the user feedback and transfer the weighted feature vectors for delivery to model 113.

Computing device 102 and model repository 112 are communicatively coupled to PLC 121. PLC 121 comprises one or more computing devices configured to receive and execute control code to generate control signaling for industrial devices 141-143. PLC 121 controls the automated and coordinated operation of industrial process 131. PLC 121 may implement a control program that may be designed using any number of programming tools in an integrated design environment such as text-based coding, functional block diagrams, ladder logic, graphics-based programming, or other types of programming interfaces. The control program may be designed or programmed on a design computer running the integrated design environment, then transmitted or uploaded to PLC 121. Alternatively, the control program may be implemented with a system of hardware connections in the PLC or in programmable PLC modules by which a PLC can be upgraded to add more control capacity as its industrial automation process grows in sophistication.

PLC 121 controls industrial devices 141-143 by sending the control signaling over one or more data channels that support synchronous or asynchronous to implement industrial process 131. Industrial process 131 may comprises a process for manufacturing goods but may also comprise processes occurring within a utility plant (e.g., an electrical power plant), research or laboratory facility (e.g., a sample testing or processing facility), processes occurring within a food processing facility (e.g., a cattle processing plant), or any other suitable industrial automated environment. Industrial devices 141-143 comprise factory or industrial machinery or manufacturing equipment such as conveyor belts or other conveyance mechanisms, robotic devices or other automated or programmable devices, packaging devices including boxing, capping, and sealing equipment, processing equipment, mixers, filling stations, quality control equipment, and other devices associated with manufacturing or other industrial processes.

Industrial devices 141-143 are coupled to PLC 121. Industrial devices 141-143 receive control signaling from PLC 121 and operate in response to the control signaling to implement industrial process 131. The control signaling drives actuators in industrial devices 141-143 that dictate the operations of industrial devices 141-143. For example, the control signaling may correspond to an actuator setting that sets a motor speed in industrial device 141 to a desired value. As industrial devices 141-143 operate in response to the control signaling, they generate process data which characterizes their operations. Industrial devices 141-143 transfer the process data that they generate to PLC 121. PLC 121 feeds the process data to repository 112 to receive machine learning feedback to augment the operations of industrial devices 141-143.

HMI environment 101, data science environment 111, PLC 121, and industrial process 131 communicate over various communication links using communication technologies like industrial ethernet, Institute of Electrical and Electronic Engineers (IEEE) 702.3 (ENET), IEEE 702.11 (WIFI), Bluetooth, Time Division Multiplex (TDM), Data Over Cable System Interface Specification (DOCSIS), Internet Protocol (IP), General Packet Radio Service Transfer Protocol (GTP), and/or some other type of wireline and/or wireless networking protocol. The communication links comprise metallic links, glass fibers, radio channels, or some other communication media. The links use ENET, WIFI, virtual switching, inter-processor communication, bus interfaces, and/or some other data communication protocols.

Computing device 102, HMI 103, machine learning model repository 112, PLC 121, and industrial devices 141-143 comprise microprocessors, software, memories, transceivers, bus circuitry, and the like. The microprocessors comprise Central Processing Units (CPUs), Graphical Processing Units (GPUs), ASICs, FPGAs, and/or the like. The memories comprise Random Access Memory (RAM), flash circuitry, Solid State Drives (SSDs), Non-Volatile Memory Express (NVMe) SSDs, Hard Disk Drives (HDDs), and/or the like. The memories store software like operating systems, user applications, radio applications, and network functions. The microprocessors retrieve the software from the memories and execute the software to drive the operation of industrial automation environment 100 as described herein.

Figure 2:
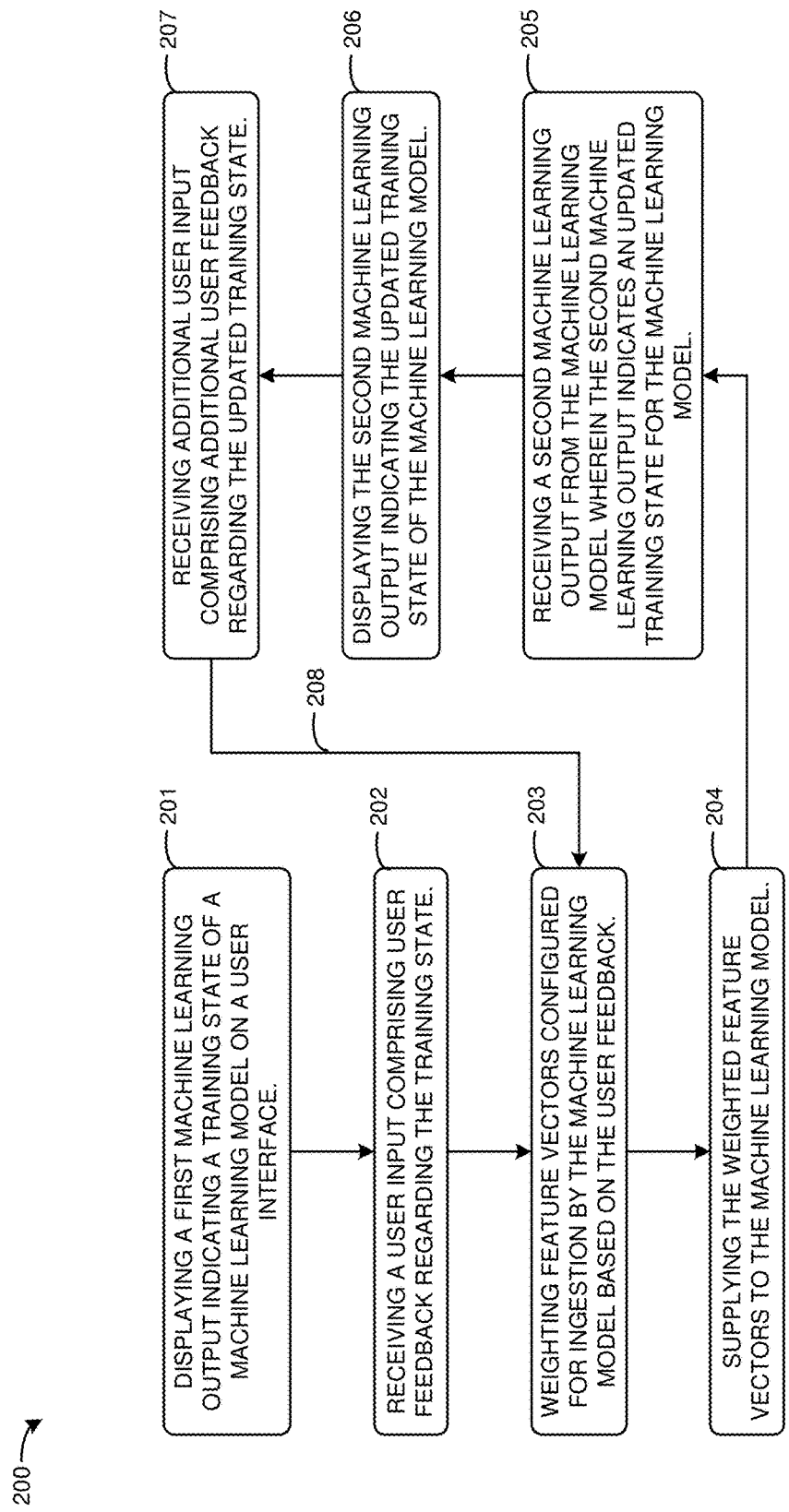
FIG. 2 illustrates an exemplary operation of an industrial automation environment to train machine learning systems based on user operations.

In some examples, industrial automation environment 100 implements process 200 illustrated in FIG. 2. It should be appreciated that the structure and operation of industrial automation environment 100 may differ in other examples.

FIG. 2 illustrates process 200. Process 200 comprises a machine learning training process based on user operations in an industrial automation environment. Process 200 may be implemented in program instructions in the context of any of the software applications, module components, or other such elements of one or more computing devices. The program instructions direct the computing device(s) to operate as follows.

In operation, process 200 begins by displaying a first machine learning output indicating a training state of a machine learning model on a user interface (step 201). The operation continues by receiving a user input comprising user feedback regarding the training state (step 202). The operation continues by weighting feature vectors configured for ingestion by the machine learning model based on the user feedback (step 203). The operation continues by supplying the weighted feature vectors to the machine learning model (step 204). The operation continues by receiving a second machine learning output from the machine learning model wherein the second machine learning output indicates an updated training state for the machine learning model (step 205). The operation continues by displaying the second machine learning output indicating the updated training state of the machine learning model (step 206). The operation continues by receiving additional user input comprising additional user feedback regarding the updated training state (step 207). In some examples, the process continues by returning to step 203 and repeats recursively (step 208).

Referring back to FIG. 1, industrial automation environment 100 includes a brief example of process 200 as employed by one or more applications hosted in HMI environment 101, data science environment 111, PLC 121, and industrial devices 141-143. In operation, PLC 121 receives and executes a control program to implement industrial process 131. In response to the execution, PLC 121 generates and transfers control signaling to industrial devices 141-143 to implement industrial process 131. For example, PLC 121 may receive a control program that dictates temperature settings for industrial devices 141-143. PLC 121 may execute the control program and generate corresponding control signaling. PLC 121 then transfers the control signaling to actuators in industrial devices 141-143 to achieve the desired temperature setting. The actuators receive the control signaling and set the temperature to the value dictated by the signaling.

Industrial devices 141-143 receive the control signaling and operate accordingly. For example, the control signaling may dictate motor speeds, temperature levels, unit quantities, and/or other types of operating metrics. As industrial devices 141-143 operate, they generate operational data that characterizes their operations. The operational data may comprise data like rotations per minute over time, units produced over time, average operating temperature or pressure, and the like. Industrial devices 141-143 report their data to PLC 121.

PLC 121 receives the operational data and transfers the operational data to machine learning repository 112 to receive machine learning feedback. PLC 121 may pre-process the operational data so that it is suitable for machine learning ingestion (e.g., feature extraction). Alternatively, PLC 121 may transfer the operational data to repository 112 and repository 112 may configure the operational data for machine learning ingestion. Machine learning model 113 ingests machine learning inputs representing the operational data generated by industrial devices 141-143. Machine learning model 113 processes the machine learning inputs using its constituent machine learning algorithms to generate machine learning outputs. The machine learning outputs may be configured to optimize the operations of industrial devices 141-143 based on the input data fed to machine learning model 113. The machine learning outputs may comprise predictions and correctional signaling for industrial devices 141-143. For example, the predictions may indicate that if industrial device 141 continues operating at its current pressure it will run out of process inputs, and the correctional signaling may comprise machine instructions that drive industrial device to reduce its operating temperature to drive down its operating pressure.

Machine learning model repository 112 transfers the machine learning outputs generated by model 113 to PLC 121. PLC 121 receives the machine learning outputs and generates corresponding control signaling to implement the outputs. The machine learning based control signaling may keep industrial devices within preferred operating ranges by autonomously manipulating Proportional Integral Derivative (PID) control values of Industrial devices 141-143, however the specific type of control scheme is not limited and may depend on the specific type of industrial device and/or industrial process being implemented.

Machine learning model repository 112 reports the machine learning outputs to computing device 102. The machine learning outputs may indicate machine learning predictions generated by model 113, actual process values that correspond to the predictions, and/or other types of operational metrics that characterize the machine learning outputs. Computing device 102 displays a visualization on HMI 103 of the machine learning outputs generated by model 113 as machine learning outputs 105 (step 201). The displaying of machine learning output 105 on HMI 103 allows plant operators to assess the training state of machine learning model 113. For example, the display may indicate accuracy metrics for the machine learning predictions. Computing device 102 also displays user prompt 106 on HMI 103 to receive user feedback on machine learning output 105. For example, user prompt 106 may comprise one or more options that allow a user to approve or disapprove of aspects of machine learning output 105. For example, user prompt 106 may comprise options that allow a user to indicate a satisfaction level for machine learning predictions that comprise machine learning output 105.

Computing device 102 receives user input(s) via HMI 103 that comprise user feedback regarding the training state of machine learning model 113 (step 202). The user feedback may comprise a satisfaction level regarding the accuracy of machine learning predictions, a rate at which machine learning suggestions are ignored by operators, and/or other types of feedback regarding the training state of model 113. For example, if the prediction accuracy of machine learning predictions generated by model 113 is low, a human operator may indicate via HMI 103 a low satisfaction level with the training state of machine learning model 113. Alternatively, if the prediction accuracy of machine learning predictions generated by model 113 is high, a human operator may indicate via HMI 103 a high satisfaction level with the training state of machine learning model 113. Computing device 102 weights feature vectors based on the user feedback that are configured for ingestion by machine learning model 113 (step 203). For example, an HMI application hosted by computing device 102 may receive the user feedback load the feedback into a machine learning interface application hosted by computing device 102. The interface application may retrieve or otherwise generate feature vectors used to train model 113. Feature vectors comprise sets of numeric values that represent an object. For example, the feature vectors retrieved by the interface application may represent the operations of industrial devices 141-143. Computing device 102 transfers the weighted feature vectors to machine learning model repository 112 for delivery to model 113 (step 204) The interface application weights the feature vectors based on the user feedback to advance the training of machine learning model 113 and transfer the feature vectors to model repository 112.

Model repository 112 supplies the feature vectors to machine learning model 113 which proceeds to train its constituent machine learning algorithms using the weighted feature vectors. Machine learning model 113 ingests the weighted feature vectors and undergoes a training process to update its constituent algorithms. Model 113 generates additional machine learning outputs using the updated algorithms and transfers the additional machine learning outputs to computing device 102. For example, PLC 121 may transfer process data generated by devices 141-143 for delivery to model 113 to generate the additional machine learning outputs. Computing device 102 receives the additional machine learning output which indicates an updated training state for machine learning model 113 (step 205). For example, the additional machine learning output may comprise new machine learning predictions generated by model 113 after model 113 has trained its constituent algorithms using the weighted feature vectors.

Computing device 102 displays the additional machine learning output on HMI 103 as machine learning output 105 (step 206). For example, the interface application hosted by computing device 102 may receive the additional outputs and drive an HMI application hosted by computing device 102 to display the additional outputs on a display screen of HMI 103. HMI 103 also displays user prompt 106 to receive additional user feedback regarding the updated training state of machine learning model 113. Computing device 102 receives additional user feedback regarding the updated training state of model 113 (step 207). Process 200 as implemented by industrial automation environment 100 may be recursive in nature and repeated the various applications hosted by computing device 102 to incrementally advance the training state of machine learning model 113. In doing so, process 200 may form a feedback loop to continuously or periodically update machine learning model 113 based on user feedback regarding outputs generated by model 113 (step 208).

Advantageously, industrial automation environment 100 effectively advances the training of machine learning model 113 based on user feedback on model 113. Moreover, industrial automation environment 100 efficiently facilitates the reception of user feedback through the use of HMI environment 101.

Figure 3:
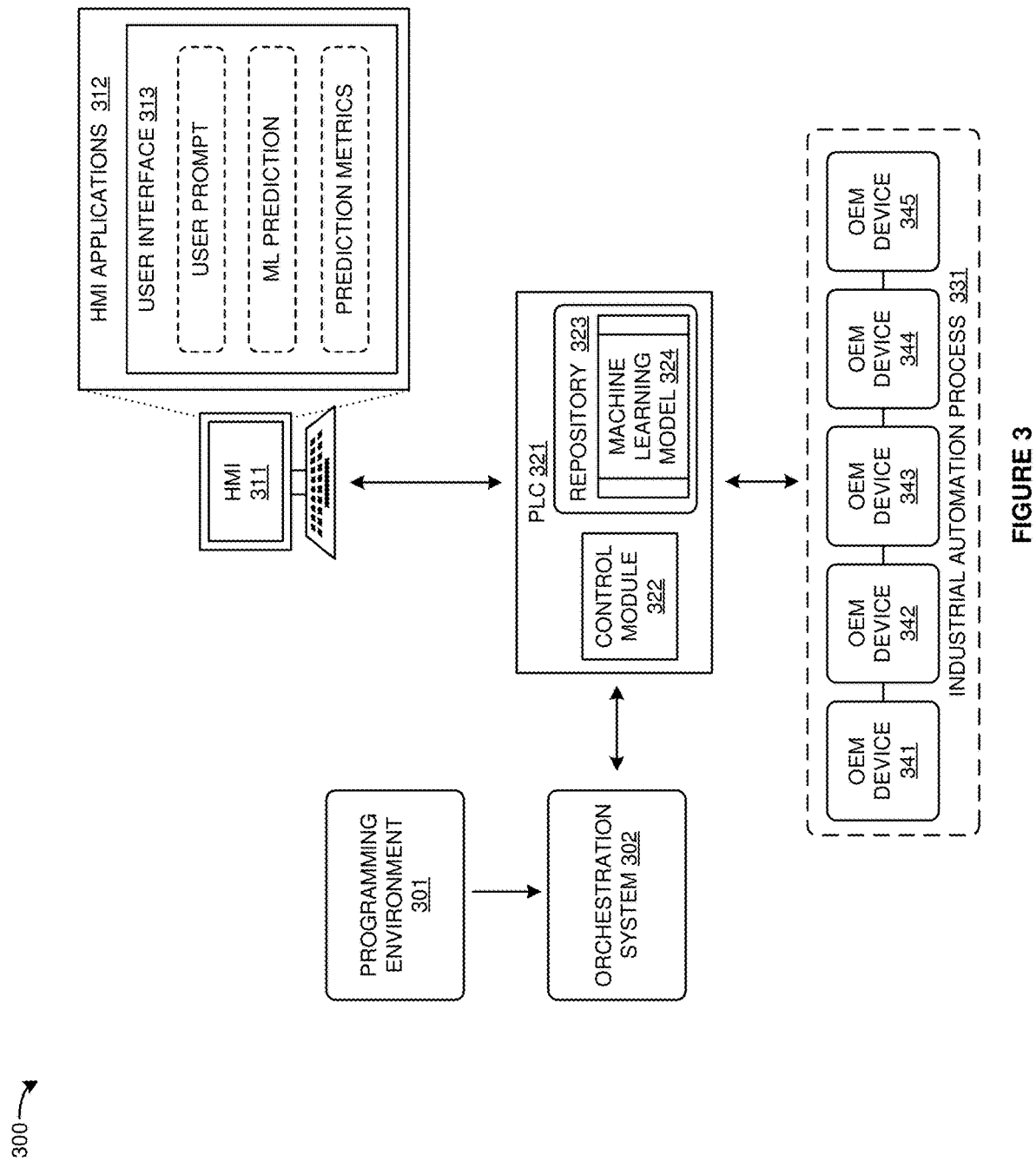
FIG. 3 illustrates an exemplary industrial automation environment to train machine learning systems based on user operations.

FIG. 3 illustrates an industrial automation environment 300 to train machine learning systems based on user operations in an industrial automation environment. Industrial automation environment 300 comprises an example of industrial automation environment 100, however environment 100 may differ. Industrial automation environment 300 comprises programming environment 301, orchestration system 302, Human Machine Interface (HMI) 311, Programmable Logic Controller (PLC) 321, industrial process 331, and Original Equipment Manufacturer (OEM) devices 341-345. HMI 311 comprises HMI applications 312 and user interface 313. HMI applications 312 are representative of various machine learning interface applications and user interface applications hosted by HMI 311. PLC 321 comprises control module 322 and repository 323. Repository 323 comprises machine learning model 324. OEM devices 341-345 are representative of various industrial components connected in series configured to implement industrial process 331.

Programming environment 301 is representative of one or more computing devices integrated into a network configured to generate control instructions for industrial automation environment 300. The one or more computing devices comprise processors, bus circuitry, storage devices, software, and the like. The processors may comprise CPUs, GPUs, ASICs, FPGAs, and the like. The storage devices comprise flash drives, RAM, HDDs, SSDs, NVMe SSDs, and the like. The storage devices store the software. The processors may retrieve and execute software stored on the storage devices to drive the operation of programming environment 301. Programming environment 301 may host one or more design applications configured to generate control instructions in response to user inputs. The control instructions may comprise visual code blocks, ladder logic, code chunks, functional block diagrams, machine learning optimizations, and/or other types of industrial control instructions.

Orchestration system 302 is representative of one or more computing devices integrated into a network configured to manage and coordinate the operation of PLC 321. Orchestration system 302 may receive a control program from programming environment 301. Orchestration system 302 hosts one or more orchestration programs configured to identify portions of the control program intended for PLC 321 and upload the identified portions to PLC 321. For example, PLC 321 may comprise one of many PLCs within industrial automation environment 300 that orchestration system 302 manages. The orchestration program hosted by system 302 may receive control programs from programming environment 301 and identify the program intended for PLC 321. The orchestration program may upload the identified program to PLC 321 and direct PLC 321 when to activate the uploaded control program. The one or more computing devices of orchestration system 302 comprise processors, bus circuitry, storage devices, software, and the like. The processors may comprise CPUs, GPUs, ASICs, FPGAs, and the like. The storage devices comprise flash drives, RAM, HDDs, SSDs, NVMe SSDs, and the like. The storage devices store the software. The processors may retrieve and execute software stored on the storage devices to drive the operation of orchestration system 302.

HMI 311 is representative of one or more computing devices configured to illustrate the operating conditions of industrial automation environment 300. The one or more computing devices comprise processors, bus circuitry, storage devices, software, and the like. The processors may comprise CPUs, GPUs, ASICs, FPGAs, and the like. The storage devices comprise flash drives, RAM, HDDs, SSDs, NVMe SSDs, and the like. The storage devices store the software. The processors may retrieve and execute software stored on the storage devices to drive the operation of HMI 311. Although HMI 301 is illustrated as a personal computing device, HMI 301 may comprise a server computer, a mobile device, a kiosk, a touchscreen device, a faceplate, or some other type of computing device capable of performing the functions described herein.

HMI 311 hosts HMI applications 312. HMI 311 comprises user interface components like displays, touchscreens, keyboards, and the like that allow a user to interact with application 312. HMI 311 comprises user interface 313 to visualize the operation of machine learning model 324 and to receive user feedback regarding the training state of model 324. User interface 313 is illustrated comprising windows for user prompt, machine learning (ML) prediction, and prediction metrics. In other examples, user interface may display different types of windows to facilitate user interaction. The user prompt window comprises one or more prompts to receive user feedback regarding machine learning predictions generated by model 324. For example, the user prompt window may comprise options that allow a user in indicate approval or disapproval of individual predictions generated by model 324, however it should be appreciated that the specific type of user prompt presented by user interface 313 is not limited. The machine learning prediction window comprises a set of machine learning predictions generated by model 324 that allows a human operator to view the predictions. For example, the prediction window may display the predictions, the purpose of the prediction, that OEM device associated with the prediction, and the like. The prediction metric window comprises a display that shows how accurate the model's predictions have been. User interface 313 may utilize illustrations, text, animations, or other types of visual indicators to characterize machine learning model 324 and to receive user feedback on the training state of machine learning model.

HMI 311 may additionally host machine learning interface application configured to interact with machine learning model 324 of PLC 321. The machine learning interface application modifies machine learning training data based on user feedback received through user interface 313. For example, the interface application may retrieve and weight feature vectors in response to receiving user input. The feature vectors comprise numeric representations of the various process, variable, and components that form industrial automation process 331.

PLC 321 is representative of an industrial controller configured to execute control programs generated by programming environment 301 and received from orchestration system 302 to implement industrial processes 331. PLC 321 comprises one or more computing devices. The one or more computing devices of PLC 321 comprise processors, bus circuitry, storage devices, software, and the like. The processors may comprise CPUs, GPUs, ASICs, FPGAs, and the like. The storage devices comprise flash drives, RAM, HDDs, SSDs, NVMe SSDs, and the like. The storage devices store the software. The processors may retrieve and execute software stored on the storage devices to drive the operation of PLC 321.

PLC 321 comprises control module 322 and repository 323. Control module 322 is representative of a control application configured to implement control programs generated in programming environment 301 to implement process 331. PLC 321 is coupled to orchestration system 302, HMI 311, repository 323, and to OEM devices 341-345. Control module 322 executes control programs to control the operation of OEM devices 341-345. The control programs may comprise ladder logic, program tags, or other types of industrial control code that provide instructions for PLC 321 to control the operations of OEM devices 341-345.

OEM devices 341-345 are coupled to PLC 321. Control module 322 transfers control signaling generated in response to the executed program to OEM devices 341-345. OEM devices 341-345 receive the control signaling and responsively operate accordingly. For example, OEM device 341 may comprise an electric motor to drive a pump. Control module 322 may execute the control instructions and determine a current level to power the electric motor at to achieve a desired pressure differential in the pump. Control module 322 may drive transceiver circuitry in PLC 321 to transfer control signaling to an actuator in the motor in OEM device 441. The actuator in the motor in OEM device 441 may receive the control signaling and apply the apply electric current to achieve the power level for the electric motor to drive the motor at the speed necessary to achieve the desired pressure differential as dictated by the control program.

PLC 321 also comprises repository 323 which is representative of one or more computing devices configured to host machine learning model 324. Repository 323 comprises processors, bus circuitry, storage devices, software, and the like. The processors may comprise CPUs, GPUs, ASICs, FPGAs, and the like. The storage devices comprise flash drives, RAM, HDDs, SSDs, NVMe SSDs, and the like. The storage devices store the software. The processors may retrieve and execute software stored on the storage devices to drive the operation of repository 323. For example, repository 323 may comprise one or more ASICs configured to run machine learning applications.

Repository 323 hosts machine learning model 324. Machine learning model 324 comprises one or more machine learning algorithms that are trained to generate machine learning outputs like process predictions or process suggestions to optimize industrial process 331. Machine learning model 324 may employ one or more machine learning algorithms through which data can be analyzed to identify patterns, make decisions, make predictions, or similarly produce output that can inform control signaling sent to OEM devices 341-345. For example, repository 323 may intake OEM process data generated by devices 341-345 and perform a feature extraction process to calculate derivative values for the OEM process data. Repository 323 may generate feature vectors based on the derivative values to represent the OEM process data and feed the feature vectors to machine learning model 324 to generate machine learning feedback. The machine learning algorithms employed by machine learning model 324 may include artificial neural networks, nearest neighbor methods, ensemble random forests, support vector machines, naïve Bayes methods, linear regressions, or other types of machine learning algorithms that predict output data based on input data.

Repository 323 may train machine learning model 324 based on user feedback received via user interface 313 in HMI 311. The feature vectors may comprise derivative values that represent performance metrics, variable ranges, and/or other training data. The feature vectors may be weighted by interface applications hosted by HMI 311 based on user feedback. The weighting emphasizes certain feature vectors over other feature vectors to influence the training of machine learning model 324. For example, the weighting may comprise numeric multipliers that correspond to ones of the feature vectors to emphasize or deemphasize ones of the feature vectors. Repository 323 may utilize supervised learning methods, unsupervised learning methods, and/or reinforcement learning methods to train machine learning model 324.

Industrial process 331 is representative of various industrial processes that operate according to control code generated in programming environment 301. The industrial processes may comprise a manufacturing process, chemical production process, food processing process, or any other type of automated industrial process. Although industrial processes 331 is depicted comprising five OEM devices, in other examples process 331 may comprise a different number of OEM devices. OEM devices 341-345 may comprise devices like pumps, compressors, heat exchanges, centrifuges, mills, conveyers, filters, and the like. OEM devices 341-345 may comprise subcomponents (not illustrated for clarity) like motors, valves, actuators, electrical circuitry, processing circuitry, storage circuitry, transceivers, machined parts, and the like.

Figure 4:
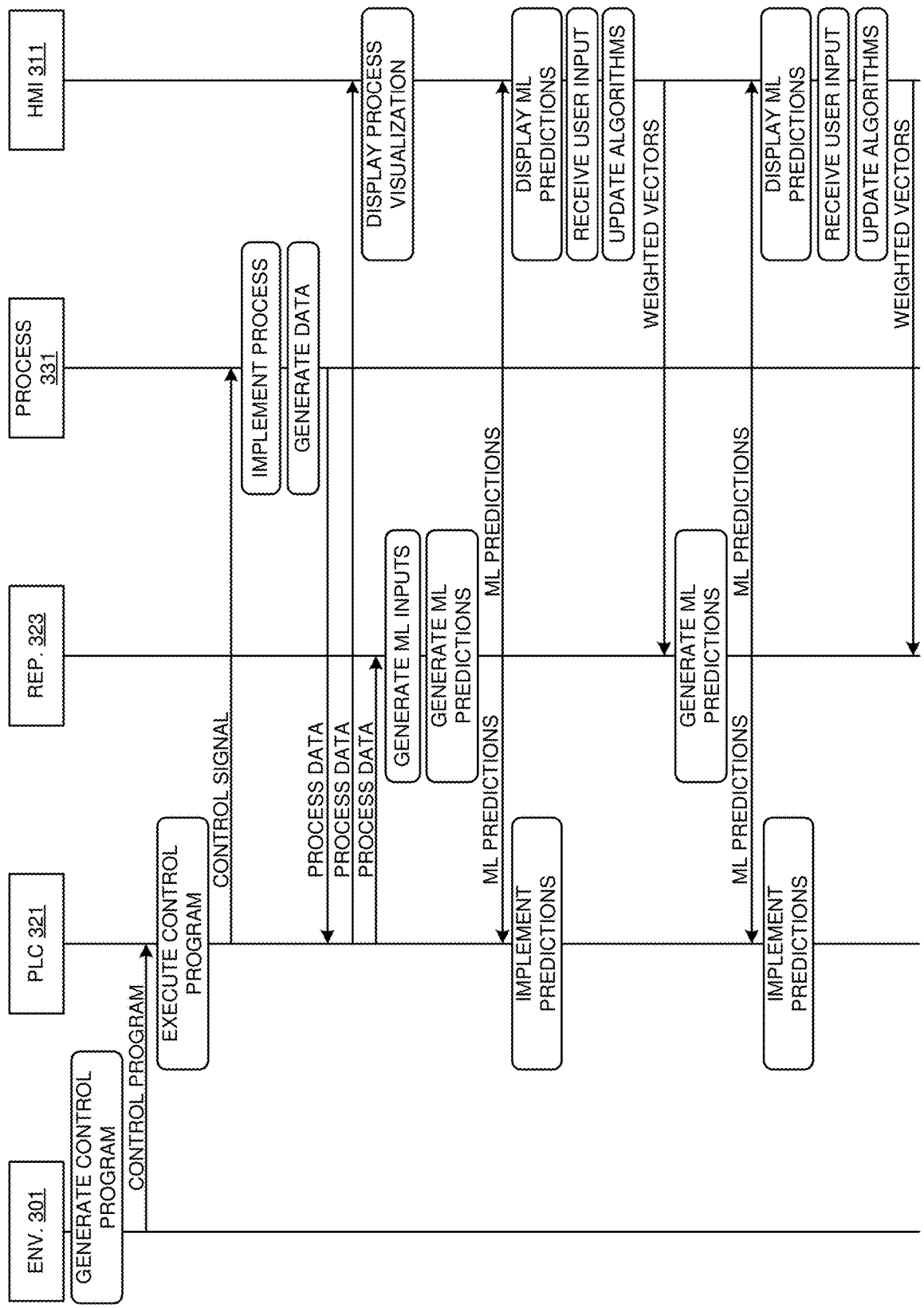
FIG. 4 illustrates an exemplary operation of an industrial automation environment to train machine learning systems based on user operations.

FIG. 4 illustrates an exemplary operation of industrial automation environment 300 to train machine learning systems based on user operations in an industrial automation environment. The operation depicted by FIG. 4 comprises an example of process 200 illustrated in FIG. 2, however process 200 may differ. In other examples, the structure and operation of industrial automation environment 300 may be different.

In operation, programming environment (ENV.) 301 generates a control program comprising a set of program tags that form a ladder logic diagram. The program tags may comprise code chunks that, when executed by PLC 321, dictate the operation of industrial process 331. The program tags comprise code that drives that start/stop of machine operations, reporting of variable metrics for a machine (e.g., temperature readouts), and/or other types of machine operations. For example, one of the program tags may represent the viscosity of a substance in OEM device 341. Typically, programming environment 301 receives user input from an operator via a user interface which drives programming environment 301 to generate the control program. Upon completion of the control program, programming environment 301 transfers the control program to orchestration system 302. Orchestration system 302 uploads the control program to PLC 321 and controls PLC 321 to implement the control program. Specifically, orchestration system 302 directs PLC 321 when to implement the control program as to coordinate the operations of PLC 321 with other PLCs within industrial automation environment 300.

PLC 321 receives the control program and control module 322 executes the control program. Control module 322 of PLC 321 responsively generates control signaling based on the control program. Control module 322 drives transceiver circuitry of PLC 321 to transfer the control signaling to OEM devices 341-345. The control signaling drives the operation of industrial process 331. For example, OEM device 345 may comprise a heat exchanger and the control program may dictate a temperature differential setting for OEM 345. Control module 322 may execute the control program and determine a valve setting to achieve a cold-water flow rate that results in the desired temperature differential. PLC 321 may transfer control signaling to an actuator in OEM device 345 to achieve the desired valve setting over an industrial ethernet link. The actuator in OEM device 345 may receive the control signaling and transfer electric current to a valve to set the valve to the position indicated by the control program.

Returning to the operation, OEM devices 341-345 of industrial process 331 receive the control signaling from PLC 321. OEM devices 341-345 implement industrial process 331 as dictated by the control program. OEM devices 341-345 may comprise different types of OEM devices from one another. For example, OEM device 341 may comprise a pump, OEM device 342 may comprise a heater, and OEM device 343 may comprise a reactor, however it should be appreciated that the device types of OEM devices 341-345 are not limited. As OEM devices 341-345 operate in response to the control signaling, they generate OEM process data that characterizes their operations. For example, if OEM device 342 comprises a motor, it may generate OEM data that indicates it power output over time. It should be appreciated that the OEM data produced by OEM devices 341-345 may depend on their device types and the type of industrial process they implement.

OEM devices 341-345 transfer their OEM operational data to PLC 321. PLC 321 receives the OEM data and responsively transfers the OEM process data to HMI 311. HMI 311 displays a visualization of industrial process 331 on user interface 313 based on the OEM process data. The visualization indicates the device types, the operational relationships, the operational metrics, and/or other data characterizing OEM devices 341-345. A human operator may view HMI 311 to assess the operating state of OEM devices 341-345.

PLC 321 also loads the process data to machine learning repository 323. Repository 323 implements an extraction process on the OEM process data to configure the process data for ingestion by machine learning model 324. Repository 323 calculates derivative values for the OEM data and combines the derivative values into feature vectors to represent various features of the OEM data. For example, an extraction process application hosted by repository 323 may construct a feature vector that represents average electrical input per day for OEM device 343. Repository 323 supplies the feature vectors representing the OEM data to machine learning model 324 as machine learning inputs.

Machine learning model 324 ingests and processes the machine learning inputs using its constituent machine learning algorithms and generates a machine learning output to control or otherwise influence the operation of OEM device 341-345. The machine learning outputs comprise machine learning predictions and corresponding control signaling readable by PLC 321. Repository 323 transfers the machine learning outputs to control module 322 which implements the machine learning predictions generated by model 324 and responsively transfers the control signaling to one or more of OEM devices 341-345. For example, machine learning model 324 may receive OEM operational data generated by OEM device 341 and determine that OEM device 341 will fall out of a target operating range (e.g., operating pressure). Model 324 may then output a prediction that device 341 will fall out of the target range as well as control signaling to drive the actuators of OEM device 341 to prevent OEM device 341 from falling out of the target operating range. Control module 322 may then transfer the machine learning generated control signaling to the actuators of OEM device 341.

PLC 321 forwards the machine learning predictions generated by model 324 to HMI 311 for display and review by a human operator. PLC 321 may transfer additional data characterizing model 324 like contextual information for the predictions (e.g., why a prediction was made), machine learning control signaling, accuracy metrics for the predictions, and/or other data that indicates the operations of model 324.

HMI 311 receives the machine learning predictions and displays a visualization of the machine learning predictions on user interface 313. The visualization may additionally indicate the model type, the operational relationships, the machine learning data, the machine learning predictions, contextual information for the predictions (e.g., why a prediction was made), machine learning control signaling, accuracy metrics for the predictions, and/or other data characterizing machine learning model 324. For example, HMI 311 may display prediction in the machine learning predictions window and the associated data characterizing the predictions in the prediction metrics window on user interface 313. A human operator may view HMI 311 to assess the operating state of machine learning model 324.

HMI 311 displays a user prompt on user interface 313 to receive feedback regarding the machine learning predictions generated by model 324. A human operator interacts with HMI 311 through user interface 313 in response to the user prompt. HMI 311 receives the user inputs that comprise the user feedback which indicate satisfaction levels for the machine learning outputs generated model 324. For example, the user prompt window displayed on user interface 313 may comprise toggles that allow a user to input whether they are satisfied or not with the machine learning inputs. A machine learning interface application hosted by HMI 311 (e.g., one of HMI applications 312) processes the user feedback and responsively weights feature vectors based on the feedback.

For example, the user feedback may indicate a machine learning prediction of an operational variable for OEM device 343 may deviate significantly from an actual operational variable reported by PLC 321. In response, the machine learning interface application may attach a numerical multiplier to the feature vector representing the operational variable to weight the feature vector. In doing so, the interface application may increase the significance of that feature vector during training of model 324 to advance the training state of model 324 and improve its prediction accuracy with regards to the operational variable.

Returning to the operation, HMI 311 transfers the weighted feature vectors to model repository 323 in PLC 321. Repository 323 supplies the weighted feature vectors to machine learning model 324 for training. Model 324 ingests the weighted feature vectors and trains its machine learning algorithms based on the weighted feature vectors. The training may alter the connections, structure, or other attributes of the machine learning algorithms used by model 324. Once the training sessions has completed, model 324 may ingest additional process data characterizing the operations of industrial automation process 331 and output additional machine learning predications. Repository 323 transfers the machine learning predictions to control module 322 in PLC 321 to implement the additional machine learning predictions. Repository 323 also transfers the additional machine learning predictions to HMI 311.

HMI 311 receives the additional machine learning predictions and displays a visualization of the machine learning predictions on user interface 313. A human operator may view HMI 311 to assess the operating state of machine learning model 324 and view the additional machine learning predictions. HMI 311 displays the user prompt on user interface 313 and receives user feedback regarding the additional machine learning predictions generated by model 324. A machine learning interface application hosted by HMI 311 processes the user feedback and responsively adjusts the weights of the feature vectors based on the feedback. For example, the user feedback may indicate the machine learning prediction of the operational variable for OEM device 343 continues to significantly from the actual operational variable reported by PLC 321. In response, the machine learning interface application may adjust the numerical multiplier applied to the weighted feature vector representing the operational variable to adjust the weight of the feature vector. In doing so, the interface application may alter the significance of that feature vector during training of model 324 to further advance the training state of model 324 and continue to improve its prediction accuracy with regards to the operational variable. It should be appreciated that the machine learning training process described above is recursive in nature and may continue until the machine learning predictions reach a satisfactory state.

In some examples, the machine learning interface application hosted by HMI 311 may weight and/or adjust the weights of feature vectors using additional metrics beside user feedback supplied via user interface 313. For example, HMI 311 may track user actions within HMI 311. The user actions may comprise user inputs that reject/accept suggestions generated by model 324, user actions to affect ones of OEM devices 141-145 (e.g., manual tuning or slowing production speed), and the like. The interface application may weight and/or adjust the weights of the feature vectors to reflect the user actions. For example, an HMI 311 may receive user inputs that reject a set of machine learning suggestions regarding a process variable for OEM device 345. In response, the interface application may attach a numeric multiplier to a feature vector representing the process variable that reduces the significance of that feature vector to inhibit model 324 from generated that suggestion.

Figure 5:
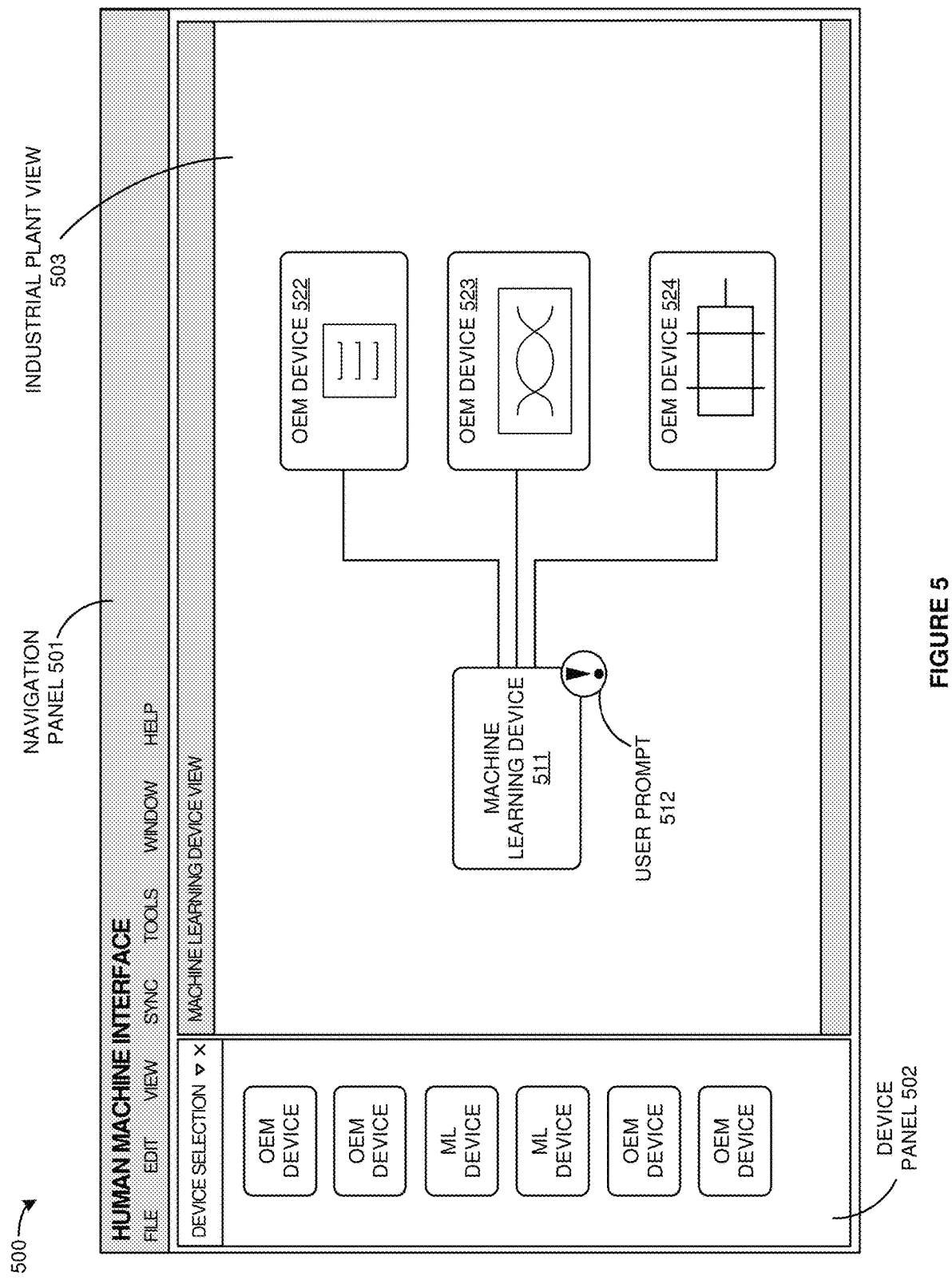
FIG. 5 illustrates an exemplary user interface in an industrial automation environment.

FIG. 5 illustrates user interface 500 to train machine learning systems based on user operations in an industrial automation environment. User interface 500 comprises an example of user interface 103 and user interface 313, however user interface 103 and user interface 313 may differ. User interface 500 comprises an HMI for an industrial automation environment presented on a display screen which is representative of any user interface for visualizing an industrial automation environment. For example, user interface 500 may comprise a GUI configured to allow a user to input user feedback regarding the training state of a machine learning model (e.g., model 324).

User interface 500 includes navigation panel 501 that allows a user to access the various features available through user interface. Navigation panel 501 comprises tabs like "FILE", "EDIT", "VIEW", "LIBRARY MANAGEMENT", "TOOLS", "WINDOW", and "HELP". In other examples, navigation panel 501 may comprise fewer tabs, more tabs, and/or different types of tabs. A user may select a tab to access the functionality of the tab. Upon selection, the tabs may open drop down menus that list their functionality. For example, a user may select the "FILE" tab and select an option from a drop-down menu to access additional functionality. Navigation panel 501 is located on a top portion of user interface 500 however navigation panel 501 may be located on a different portion of user interface 500. For example, navigation panel 501 may be located on the bottom portion of user interface 500.

User interface 500 incudes device panel 502. Device panel 502 comprises a device selection system that allows a user to select and view operating aspects of OEM devices and machine learning devices. For example, a user may select on of the OEM devices displayed in device panel 502 and user interface my drive industrial plant view 503 to center the selected device on screen and display operating metrics for the device. In this example, the device selection panel displays a view of four OEM devices and two machine learning devices, however, the device selection panel may display a different number of devices and/or different types of devices. Typically, device panel 502 will display OEM devices and machine learning devices that the HMI is operationally coupled to. Device panel 502 is presented on a left portion of user interface 500, however device panel 502 may be presented on a different location of user interface 500.

User interface 500 includes industrial plant view 503. Industrial plant view 503 comprises a visualization of an industrial automation environment that indicates the OEM devices, machine learning models, and operation relationships between the models and OEM devices. In this example, industrial plant view 503 comprises machine learning device 511, user prompt 512, and OEM devices 522-524. Industrial plant view 503 indicates the connections between machine learning device 511 and OEM devices 522-524. For example, the connections may indicate that machine learning device 511 provides machine learning outputs to influence the operation of OEM devices 522-524 within the automated industrial environment. OEM devices 522-524 may comprise text and illustrations that indicate the device types of the OEM devices. Industrial plant view 503 also displays user prompt on machine learning device 511. User prompt 512 comprises a selectable option that, in response to user input, displays an expanded view of machine learning device 511. The expanded view may present machine learning predictions generated by machine learning device 511 and selectable options that allows a user to input feedback regarding the machine learning predictions.

Figure 6:
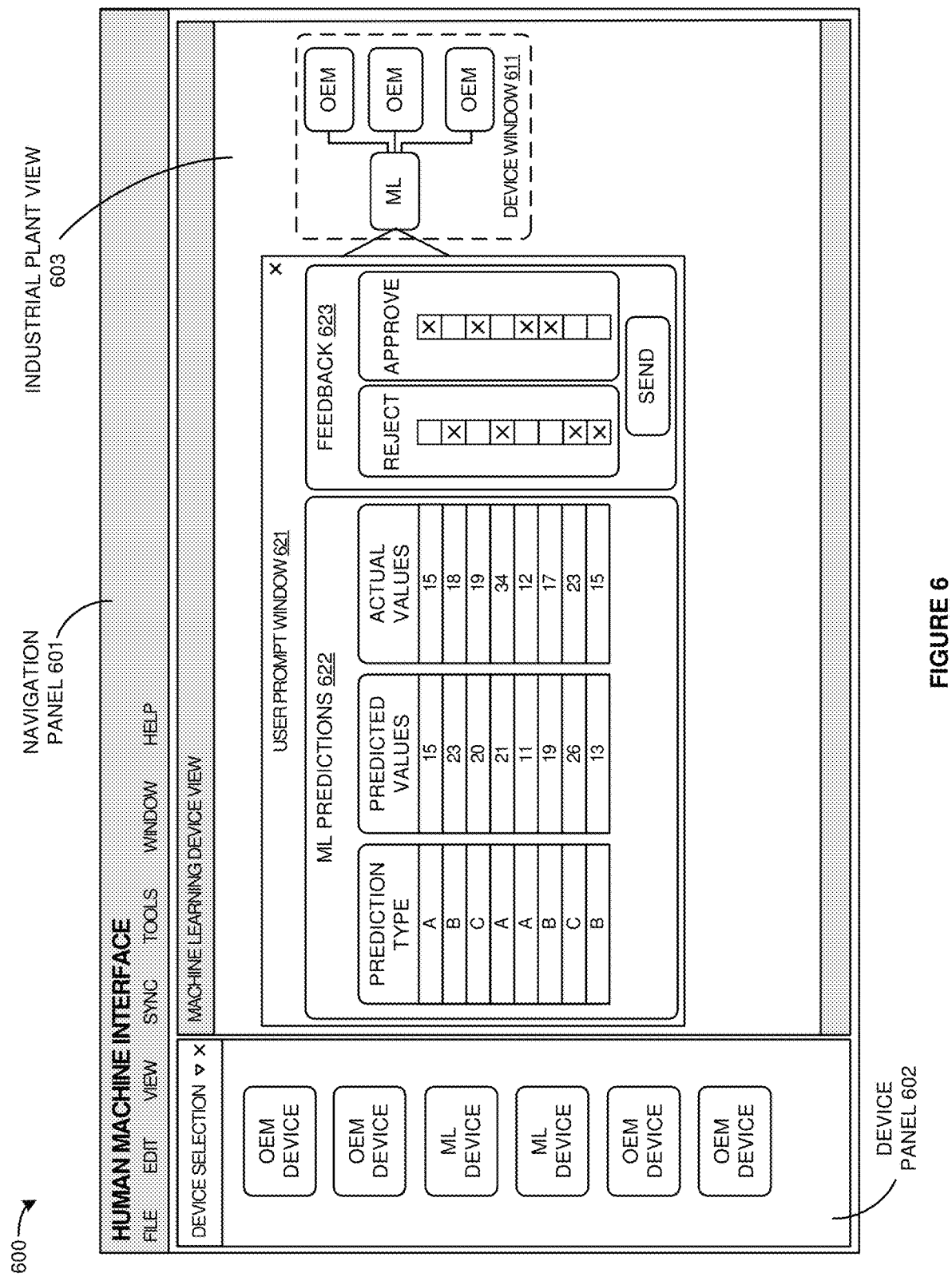
FIG. 6 illustrates an exemplary user interface in an industrial automation environment.

FIG. 6 illustrates user interface 600 to train machine learning systems based on user operations in an industrial automation environment. User interface 600 comprises an example of user interface 103 and user interface 313, however user interface 103 and user interface 313 may differ. User interface 600 comprises an HMI of an automated industrial environment presented on a display screen which is representative of any user interface for visualizing an automated industrial environment. For example, user interface 600 may be displayed in response to a user selection of user prompt 512 on user interface 500 illustrated in FIG. 5.

User interface 600 includes navigation panel 601 that allows a user to access the various features available through user interface. Navigation panel 601 comprises tabs like "FILE", "EDIT", "VIEW", "LIBRARY MANAGEMENT", "TOOLS", "WINDOW", and "HELP". In other examples, navigation panel 601 may comprise fewer tabs, more tabs, and/or different types of tabs. A user may select a tab to access the functionality of the tab. Upon selection, the tabs may open drop down menus that list their functionality. For example, a user may select the "HELP" tab and select an option from a drop-down menu to access additional functionality. Navigation panel 601 is located on a top portion of user interface 600 however navigation panel 601 may be located on a different portion of user interface 600. For example, navigation panel 601 may be located on the bottom portion of user interface 600.

User interface 600 incudes device panel 602. Device panel 602 comprises a device selection system that allows a user to select and view operating aspects of OEM devices and machine learning devices. In this example, the device selection panel displays a view of four OEM devices and two machine learning devices, however, the device selection panel may display a different number of devices and/or different types of devices. Typically, device panel 602 will display OEM devices and machine learning devices that the HMI is operationally coupled to. Device panel 602 is presented on a left portion of user interface 500, however device panel 602 may be presented on a different location of user interface 500.

User interface 600 includes industrial plant view 603. Industrial plant view 603 comprises a visualization of an industrial automation environment after a user has selected a user prompt for a machine learning device. In this example, industrial plant view device window 611 and user prompt window 621. For example, a user may have selected a user prompt (e.g., user prompt 512 illustrated in FIG. 5) associated with a machine learning device in device window 611, and the user selection may drive user interface 600 to display device context window 621 in industrial plant view 603.

User prompt window 621 comprises an expanded view of a machine learning device and comprises machine learning predictions window 622 and feedback window 623. Predictions window 622 displays a list of machine learning predictions generated by a machine learning device. The list of machine learning predictions indicates the prediction types, the predicted values, and the actual values measured within the industrial automation environment that correspond to the predicted values. For example, prediction type A may represent a prediction for a class of OEM device, the corresponding prediction value may represent a value predicted by a machine learning device for the class of OEM device, and the actual value may represent the process value reported by a PLC for the class of OEM device. In other example, prediction window 622 may comprise additional metrics that characterize the machine learning predictions.

Feedback window 623 comprises a set of selectable options that allow a user to approve or reject corresponding ones of the machine learning predictions. In this example, the prediction types, predicted values, actual values, reject options, and approve options are organized by into corresponding rows. However, it should be appreciated that the graphical organization of user prompt window 621 may differ in other examples. Once a user has indicated their approval or rejection of the machine learning predictions in feedback window 623, the user may select the selectable option labeled "SEND". The selection drives user interface 600 to indicate the user feedback received via feedback window 623 to a machine learning interface application. The interface application may weight and/or adjust the weights of feature vectors based on the user input to advance the training of the machine learning model that generated the predictions display by machine learning predictions window 622. Upon selection of the "send" option, user interface 600 may close, or otherwise reduce the prominence of user prompt window 621 and present an expanded view of device window 611.

Figure 7:
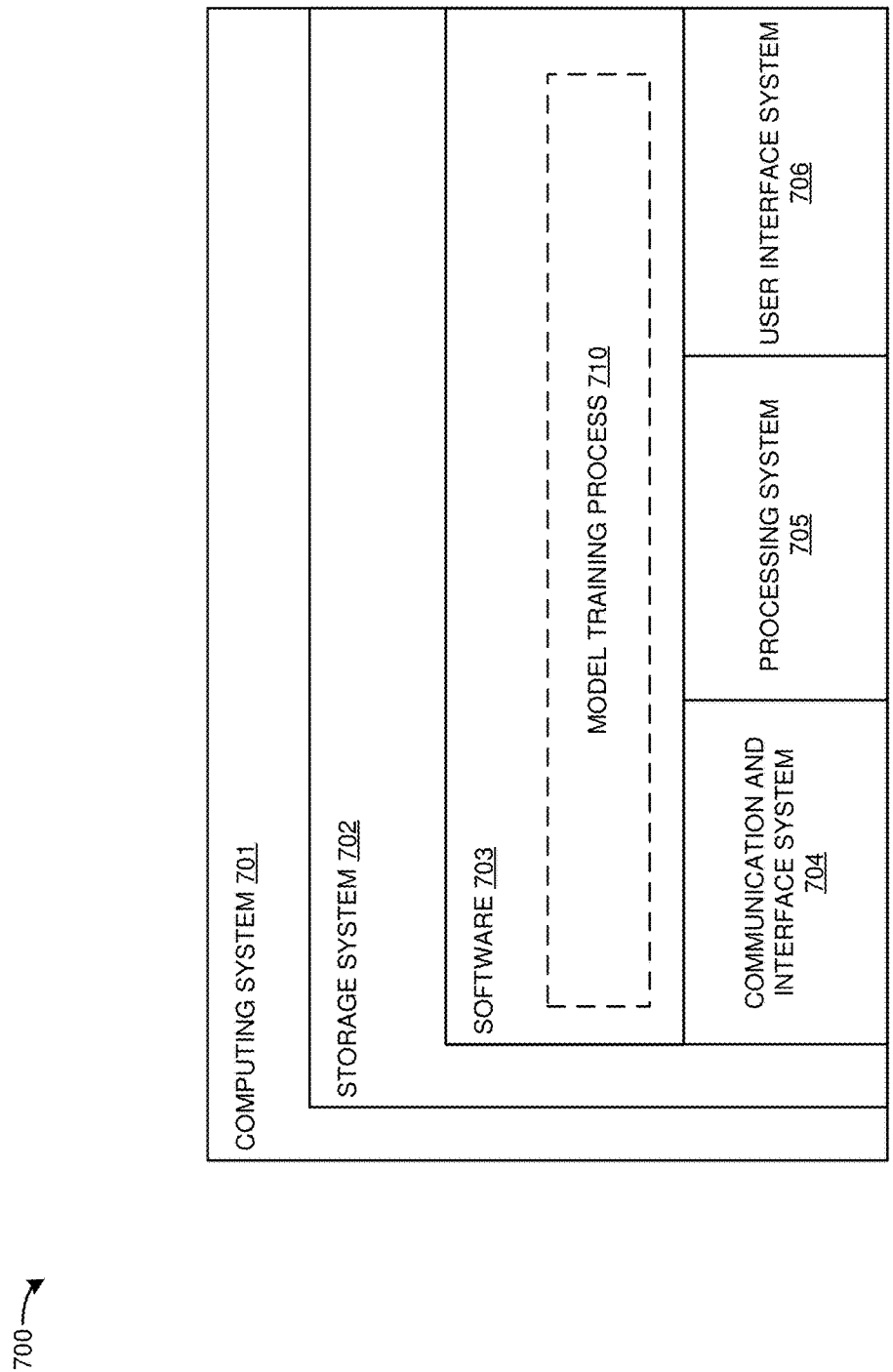
FIG. 7 illustrates an exemplary computing device that may be used in accordance with some embodiments of the present technology.

FIG. 7 illustrates computing system 701 to train machine learning systems based on user operations in an industrial automation environment according to an implementation of the present technology. Computing system 701 is representative of any system or collection of systems with which the various operational architectures, processes, scenarios, and sequences disclosed herein training machine learning systems within industrial automation environments may be employed. For example, computing system 701 may be representative of computing device 102, machine learning model repository 112, PLC 121, HMI 311, PLC 321, and/or any other computing device contemplated herein. Computing system 701 may be implemented as a single apparatus, system, or device or may be implemented in a distributed manner as multiple apparatuses, systems, or devices. Computing system 701 includes, but is not limited to, storage system 702, software 703, communication interface system 704, processing system 705, and user interface system 706. Processing system 705 is operatively coupled with storage system 702, communication interface system 704, and user interface system 706.

Processing system 705 loads and executes software 703 from storage system 702. Software 703 includes and implements model training process 710, which is representative of any of the machine learning training processes discussed with respect to the preceding Figures, including but not limited to the industrial control, machine learning training, and HMI operations described with respect to the preceding Figures. For example, model training process 710 may be representative of process 200 illustrated in FIG. 2 and/or the exemplary operation of environment 300 illustrated in FIG. 4. When executed by processing system 705 to train a machine learning model based on user feedback, software 703 directs processing system 705 to operate as described herein for at least the various processes, operational scenarios, and sequences discussed in the foregoing implementations. Computing system 701 may optionally include additional devices, features, or functionality not discussed for purposes of brevity.

Processing system 705 may comprise a micro-processor and other circuitry that retrieves and executes software 703 from storage system 702. Processing system 705 may be implemented within a single processing device but may also be distributed across multiple processing devices or subsystems that cooperate in executing program instructions. Examples of processing system 705 include general purpose CPUs, GPUs, ASICs, FPGAs, and logic devices, as well as any other type of processing device, combinations, or variations thereof.

Storage system 702 may comprise any computer readable storage media readable by processing system 705 and capable of storing software 703. Storage system 702 may include volatile, nonvolatile, removable, and/or non-removable media implemented in any method or technology for storage of information, such as computer readable instructions, data structures, program modules, or other data. Examples of storage media include RAM, read only memory, magnetic disks, optical disks, optical media, flash memory, virtual memory and non-virtual memory, magnetic cassettes, magnetic tape, magnetic disk storage or other magnetic storage devices, or any other suitable storage media. In no case is the computer readable storage media a propagated signal.

In addition to computer readable storage media, in some implementations storage system 702 may also include computer readable communication media over which at least some of software 703 may be communicated internally or externally. Storage system 702 may be implemented as a single storage device but may also be implemented across multiple storage devices or sub-systems co-located or distributed relative to each other. Storage system 702 may comprise additional elements, such as a controller, capable of communicating with processing system 705 or possibly other systems.

Software 703 (including model visualization process 710) may be implemented in program instructions and among other functions may, when executed by processing system 705, direct processing system 705 to operate as described with respect to the various operational scenarios, sequences, and processes illustrated herein. For example, software 703 may include program instructions for receiving user feedback on an HMI and training a machine learning model based on the user feedback as described herein.

In particular, the program instructions may include various components or modules that cooperate or otherwise interact to carry out the various processes and operational scenarios described herein. The various components or modules may be embodied in compiled or interpreted instructions, or in some other variation or combination of instructions. The various components or modules may be executed in a synchronous or asynchronous manner, serially or in parallel, in a single threaded environment or multi-threaded, or in accordance with any other suitable execution paradigm, variation, or combination thereof. Software 703 may include additional processes, programs, or components, such as operating system software, virtualization software, or other application software. Software 703 may also comprise firmware or some other form of machine-readable processing instructions executable by processing system 705.

In general, software 703 may, when loaded into processing system 705 and executed, transform a suitable apparatus, system, or device (of which computing system 701 is representative) overall from a general-purpose computing system into a special-purpose computing system customized to display machine learning outputs on an HMI, receive user feedback on the outputs, and train a machine learning model based on the feedback as described herein. Indeed, encoding software 703 on storage system 702 may transform the physical structure of storage system 702. The specific transformation of the physical structure may depend on various factors in different implementations of this description. Examples of such factors may include, but are not limited to, the technology used to implement the storage media of storage system 702 and whether the computer-storage media are characterized as primary or secondary storage, as well as other factors.

For example, if the computer readable storage media are implemented as semiconductor-based memory, software 703 may transform the physical state of the semiconductor memory when the program instructions are encoded therein, such as by transforming the state of transistors, capacitors, or other discrete circuit elements constituting the semiconductor memory. A similar transformation may occur with respect to magnetic or optical media. Other transformations of physical media are possible without departing from the scope of the present description, with the foregoing examples provided only to facilitate the present discussion.

Communication interface system 704 may include communication connections and devices that allow for communication with other computing systems (not shown) over communication networks (not shown). Examples of connections and devices that together allow for inter-system communication may include network interface cards, antennas, power amplifiers, radiofrequency circuitry, transceivers, and other communication circuitry. The connections and devices may communicate over communication media to exchange communications with other computing systems or networks of systems, such as metal, glass, air, or any other suitable communication media. The aforementioned media, connections, and devices are well known and need not be discussed at length here.

Communication between computing system 701 and other computing systems (not shown), may occur over a communication network or networks and in accordance with various communication protocols, combinations of protocols, or variations thereof. Examples include intranets, internets, the Internet, local area networks, wide area networks, wireless networks, wired networks, virtual networks, software defined networks, data center buses and backplanes, or any other type of network, combination of networks, or variation thereof. The aforementioned communication networks and protocols are well known and an extended discussion of them is omitted for the sake of brevity.

While some examples provided herein are described in the context of computing devices for machine learning model training, it should be understood that the condition systems and methods described herein are not limited to such embodiments and may apply to a variety of other industrial automation environments and their associated systems. As will be appreciated by one skilled in the art, aspects of the present invention may be embodied as a system, method, computer program product, and other configurable systems. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof means any connection or coupling, either direct or indirect, between two or more elements; the coupling or connection between the elements can be physical, logical, or a combination thereof. Additionally, the words "herein," "above," "below," and words of similar import, when used in this application, refer to this application as a whole and not to any particular portions of this application. Where the context permits, words in the above Detailed Description using the singular or plural number may also include the plural or singular number, respectively. The word "or" in reference to a list of two or more items, covers all of the following interpretations of the word: any of the items in the list, all of the items in the list, and any combination of the items in the list.

The phrases "in some embodiments," "according to some embodiments," "in the embodiments shown," "in other embodiments," and the like generally mean the particular feature, structure, or characteristic following the phrase is included in at least one implementation of the present technology and may be included in more than one implementation. In addition, such phrases do not necessarily refer to the same embodiments or different embodiments.

The above Detailed Description of examples of the technology is not intended to be exhaustive or to limit the technology to the precise form disclosed above. While specific examples for the technology are described above for illustrative purposes, various equivalent modifications are possible within the scope of the technology, as those skilled in the relevant art will recognize. For example, while processes or blocks are presented in a given order, alternative implementations may perform routines having steps, or employ systems having blocks, in a different order, and some processes or blocks may be deleted, moved, added, subdivided, combined, and/or modified to provide alternative or subcombinations. Each of these processes or blocks may be implemented in a variety of different ways. Also, while processes or blocks are at times shown as being performed in series, these processes or blocks may instead be performed or implemented in parallel or may be performed at different times. Further any specific numbers noted herein are only examples: alternative implementations may employ differing values or ranges.

The teachings of the technology provided herein can be applied to other systems, not necessarily the system described above. The elements and acts of the various examples described above can be combined to provide further implementations of the technology. Some alternative implementations of the technology may include not only additional elements to those implementations noted above, but also may include fewer elements.

These and other changes can be made to the technology in light of the above Detailed Description. While the above description describes certain examples of the technology, and describes the best mode contemplated, no matter how detailed the above appears in text, the technology can be practiced in many ways. Details of the system may vary considerably in its specific implementation, while still being encompassed by the technology disclosed herein. As noted above, particular terminology used when describing certain features or aspects of the technology should not be taken to imply that the terminology is being redefined herein to be restricted to any specific characteristics, features, or aspects of the technology with which that terminology is associated. In general, the terms used in the following claims should not be construed to limit the technology to the specific examples disclosed in the specification, unless the above Detailed Description section explicitly defines such terms. Accordingly, the actual scope of the technology encompasses not only the disclosed examples, but also all equivalent ways of practicing or implementing the technology under the claims.

To reduce the number of claims, certain aspects of the technology are presented below in certain claim forms, but the applicant contemplates the various aspects of the technology in any number of claim forms. For example, while only one aspect of the technology is recited as a computer-readable medium claim, other aspects may likewise be embodied as a computer-readable medium claim, or in other forms, such as being embodied in a means-plus-function claim. Any claims intended to be treated under 35 U.S.C. § 112(f) will begin with the words "means for" but use of the term "for" in any other context is not intended to invoke treatment under 35 U.S.C. § 112(f). Accordingly, the applicant reserves the right to pursue additional claims after filing this application to pursue such additional claim forms, in either this application or in a continuing application.

What is claimed is:

1. A system to train machine learning systems based on user operations in an industrial automation environment, the system comprising:
   a memory that stores executable components; and
   a processor, operatively coupled to the memory, that executes the executable components, the executable components comprising:
   a Human Machine Interface (HMI) component configured to monitor user actions in the automated industrial environment, generate user data that characterizes the user actions, display a first machine learning output indicating a training state of a machine learning model on a user interface, receive a user input comprising user feedback regarding a training state of the machine learning model, and transfer the user feedback and the user data to a machine learning interface component;
   the machine learning interface component configured to receive the user feedback and the user data, weight feature vectors configured for ingestion by the machine learning model based on the user feedback and the user data, and supply the weighted feature vectors to the machine learning model;
   the machine learning model configured to ingest the weighted feature vectors, train its constituent machine learning algorithms using the weighted feature vectors to update the training state of the machine learning model, and process the weighted feature vectors using the trained machine learning algorithms to generate a second machine learning output;
   the machine learning interface component configured to receive the second machine learning output from the machine learning model wherein the second machine learning output indicates the updated training state for the machine learning model, and transfer the second machine learning output to the HMI component; and
   the HMI component configured to display the second machine learning output indicating the updated training state of the machine learning model, receive an additional user input comprising additional user feedback regarding the updating training state, and transfer the additional user feedback to the machine learning interface component.

2. The system of claim 1 wherein:
   the machine learning interface component is further configured to receive the additional user feedback, adjust the weights the of the weighted feature vectors based on the additional user feedback, and supply the adjusted weighted feature vectors to the machine learning model;
   the machine learning interface component is further configured to receive a third machine learning output from the machine learning model wherein the third machine learning output indicates a further updated training state for the machine learning model and transfer the third machine learning output to the HMI component.

3. The system of claim 2 wherein:
   the machine learning model is further configured to generate and transfer the first machine learning output using the constituent machine learning algorithms; and
   the machine learning model is further configured to ingest the adjusted weighted feature vectors, trains the constituent machine learning algorithms using the adjusted weighted feature vectors to further update the training state of the machine learning model, and process the adjusted weighted feature vectors using the further trained machine learning algorithms to generate the third machine learning output.

4. The system of claim 2 wherein:
   the first machine learning output, the second machine learning output, and the third machine learning output comprise machine learning predictions for the industrial automation environment; and
   the user feedback indicates user approval or user disapproval of the machine learning predictions for the industrial automation environment.

5. The system of claim 4 wherein:
   the HMI component is further configured to display predicted values associated with the machine learning predictions and actual values that correspond to individual ones of the predicted values.

6. The system of claim 1 wherein:
   the HMI component is further configured to display a prompt to receive the user input comprising the feedback regarding the training state; and
   the HMI component is further configured to display the user prompt to receive the additional user input comprising the additional user feedback regarding the updating training state.

7. The system of claim 1 wherein the industrial automation environment comprises one or more of a manufacturing environment, a chemical production environment, or a food processing environment.

8. A method for training machine learning systems based on user operations in an industrial automation environment, the method comprising:

monitoring, by the system, user actions in the automated industrial environment and generating user data that characterizes the user actions;

displaying, by a system comprising a processor, a first machine learning output indicating a training state of a machine learning model on a user interface and receiving a user input comprising user feedback regarding a training state of the machine learning model;

weighting, by the system, feature vectors configured for ingestion by the machine learning model based on the user feedback and the user data and supplying the weighted feature vectors to the machine learning model;

ingesting, by the system, the weighted feature vectors, training constituent machine learning algorithms of the machine learning model using the weighted feature vectors to update the training state of the machine learning model, and processing the weighted feature vectors using the trained machine learning algorithms to generate a second machine learning output;

receiving, by the system, the second machine learning output from the machine learning model wherein the second machine learning output indicates an updated training state for the machine learning model; and displaying, by the system, the second machine learning output indicating the updated training state of the machine learning model and receiving an additional user input comprising additional user feedback regarding the updating training state.

9. The method of claim 8 further comprising:

adjusting, by the system, the weights of the of the weighted feature vectors based on the additional user feedback and supplying the adjusted weighted feature vectors to the machine learning model;

receiving, by the system, a third machine learning output from the machine learning model wherein the third machine learning output indicates a further updated training state for the machine learning model.

10. The method of claim 9 further comprising:

generating, by the system, the first machine learning output using a set of machine learning algorithms; and ingesting, by the system, the adjusted weighted feature vectors, training the constituent machine learning algorithms using the adjusted weighted feature vectors to further update the training state of the machine learning model, and processing the adjusted weighted feature vectors using the further trained machine learning algorithms to generate the third machine learning output.

11. The method of claim 9 wherein:

the first machine learning output, the second machine learning output, and the third machine learning output comprise machine learning predictions for the industrial automation environment; and the user feedback indicates user approval or user disapproval of the machine learning predictions for the industrial automation environment.

12. The method of claim 11 further comprising:

displaying, by the system, predicted values associated with the machine learning predictions and actual values that correspond to individual ones of the predicted values.

13. The method of claim 8 further comprising:

displaying, by the system, a prompt to receive the user input comprising the feedback regarding the training state; and displaying, by the system, the user prompt to receive the additional user input comprising the additional user feedback regarding the updating training state.

14. The method of claim 8 wherein the industrial automation environment comprises one or more of a manufacturing environment, a chemical production environment, or a food processing environment.

15. A non-transitory computer-readable medium stored thereon instructions to train machine learning systems based on user operations in an industrial automation environment that, in response to execution, cause a system comprising a processor to perform operations, the operations comprising:

monitoring user actions in the automated industrial environment and generating user data that characterizes the user actions;

displaying a first machine learning output indicating a training state of a machine learning model on a user interface and receiving a user input comprising user feedback regarding a training state of the machine learning model;

weighting feature vectors configured for ingestion by the machine learning model based on the user feedback and the user data and supplying the weighted feature vectors to the machine learning model;

ingesting the weighted feature vectors, training constituent machine learning algorithms of the machine learning model using the weighted feature vectors to update the training state of the machine learning model, and processing the weighted feature vectors using the trained machine learning algorithms to generate a second machine learning output;

receiving the second machine learning output from the machine learning model wherein the second machine learning output indicates an updated training state for the machine learning model; and displaying the second machine learning output indicating the updated training state of the machine learning model and receiving an additional user input comprising additional user feedback regarding the updating training state.

16. The non-transitory computer-readable medium of claim 15, wherein the operations further comprise:

adjusting the weights of the of the weighted feature vectors based on the additional user feedback and supplying the adjusted weighted feature vectors to the machine learning model;

receiving a third machine learning output from the machine learning model wherein the third machine learning output indicates a further updated training state for the machine learning model.

17. The non-transitory computer-readable medium of claim 16, wherein the operations further comprise:

generating the first machine learning output using a set of machine learning algorithms; and ingesting the adjusted weighted feature vectors, training the constituent machine learning algorithms using the adjusted weighted feature vectors to further update the training state of the machine learning model, and processing the adjusted weighted feature vectors using the further trained machine learning algorithms to generate the third machine learning output.

18. The non-transitory computer-readable medium of claim 16 wherein:

the first machine learning output, the second machine learning output, and the third machine learning output comprise machine learning predictions for the industrial automation environment; and the user feedback indicates user approval or user disapproval of the machine learning predictions for the industrial automation environment.

19. The non-transitory computer-readable medium of claim 18, wherein the operations further comprise:
displaying predicted values associated with the machine learning predictions and actual values that correspond to individual ones of the predicted values.

20. The non-transitory computer-readable medium of claim 15 wherein the industrial automation environment comprises one or more of a manufacturing environment, a chemical production environment, or a food processing environment.

* * * * *